United States Patent
Smith

(10) Patent No.: US 8,230,822 B2
(45) Date of Patent: Jul. 31, 2012

(54) PET COLLAR HAVING RETRACTABLE LEASH

(76) Inventor: Sandra W. Smith, Knoxville, TN (US)

( * ) Notice: Subject to any disclaimer, the term of this patent is extended or adjusted under 35 U.S.C. 154(b) by 179 days.

(21) Appl. No.: 12/541,563

(22) Filed: Aug. 14, 2009

(65) Prior Publication Data

US 2011/0036304 A1 Feb. 17, 2011

(51) Int. Cl.
*A01K 27/00* (2006.01)

(52) U.S. Cl. ........ 119/794; 119/796

(58) Field of Classification Search ........ 119/792–797; 242/370, 396, 396.4, 385.4, 384.7
See application file for complete search history.

(56) References Cited

U.S. PATENT DOCUMENTS

| | | | |
|---|---|---|---|
| 870,784 A * | 11/1907 | Huff | 119/794 |
| 3,776,198 A | 12/1973 | Gehrke | |
| 4,018,189 A | 4/1977 | Umphries | |
| 4,165,713 A | 8/1979 | Brawner et al. | |
| 4,197,817 A | 4/1980 | Crutchfield | |
| 4,328,766 A | 5/1982 | Deibert | |
| 4,328,767 A | 5/1982 | Peterson | |
| 4,501,230 A | 2/1985 | Talo | |
| 4,964,370 A | 10/1990 | Peterson | |
| 4,977,860 A | 12/1990 | Harwell | |
| 5,595,143 A | 1/1997 | Alberti | |
| 5,816,198 A | 10/1998 | Peterson | |
| 5,890,456 A | 4/1999 | Tancrede | |
| 5,947,062 A | 9/1999 | Hoffman et al. | |
| 6,003,472 A | 12/1999 | Matt et al. | |
| 6,148,773 A | 11/2000 | Bogdahn | |
| 6,474,270 B1 | 11/2002 | Imes | |
| 6,712,026 B1 | 3/2004 | Carville, Jr. | |
| 6,792,893 B1 | 9/2004 | Quintero et al. | |
| 6,912,975 B1 | 7/2005 | Balan | |
| 7,040,257 B2 * | 5/2006 | Waxman et al. | 119/796 |
| 2004/0154556 A1 * | 8/2004 | Masterson et al. | 119/794 |
| 2007/0022975 A1 * | 2/2007 | Arnold | 119/796 |
| 2008/0017134 A1 * | 1/2008 | Robley et al. | 119/796 |

* cited by examiner

*Primary Examiner* — Kimberly Berona
(74) *Attorney, Agent, or Firm* — Luedeka Neely Group, P.C.

(57) ABSTRACT

A pet collar assembly is removably attached to a pet collar and carries a leash. The assembly allows for extending and retracting the leash and includes a housing, an actuator assembly for actuating retraction of the leash upon receiving force higher than a threshold retraction force, and a spool communicating with the actuator assembly and biased for coiling the leash. The actuator assembly has a button and a button shaft that mechanically communicates with a hook shaft attached to a hook. The hook engages a plurality of teeth disposed on the circumference of a rim of the spool. An elastic band applies force against the hook so that the actuator assembly remains in a locked configuration unless a force higher than the threshold retraction force is received by the button.

16 Claims, 6 Drawing Sheets

PET COLLAR HAVING RETRACTABLE LEASH

FIELD

This disclosure relates to the field of pet collars. More particularly, the disclosure relates to a pet collar having a leash retractable into a housing removably attached to the collar.

BACKGROUND AND SUMMARY

Typically, pet leash mechanisms are biased to provide constant retraction force. That is, as the pet moves away from the leash holder (owner), the pet leash mechanism constantly pulls the animal toward the mechanism. Such a pull can cause irritation of the pet's skin and frustration to a pet seeking a measure of freedom. Further, the constant pull of typical pet leash mechanisms indicates to the pet that the owner wishes for the pet to remain close to the owner when this may or may not be the case.

Also, pet leash mechanisms, including the spool for winding the leash as it is retracted, are held by the pet owner. When the owner has finished walking the pet, the distal end of the leash is detached from the pet's collar. The owner then places the pet leash mechanism aside for the next walk. Inevitably, later in the day, the owner decides it is time for walking the pet and the leash has been misplaced. This problem is prevalent in situations where more than one person walk the pet. For example, a first person walks the pet, detaches the mechanism and places it somewhere he will remember. Later, a second person desires to walk the pet but does not know where the first person has placed the mechanism.

Thus, there is a need for a pet collar assembly for carrying a leash and providing means for retracting the leash on demand. There is a need for the assembly to be carried by the pet but should remain detachable as necessary.

The above and other needs are met by a pet collar assembly removably attached to a pet collar for carrying a leash and extending and retracting the leash as necessary. The pet collar assembly includes a housing, an actuator disposed adjacent the housing for actuating retraction of the leash upon receiving outside force higher than a threshold retraction force, and a spool communicating with the actuator and for coiling the leash when the actuator receives outside force higher than the threshold retraction force.

In some embodiments, the pet collar assembly includes a fastener receiver disposed proximate to an upper surface of the housing and wherein the leash has a distal end and comprises a fastener disposed at its distal end, the fastener for detachably mating with the fastener receiver. The fastener receiver includes a first piece and a second piece disposed proximate to one another and provides a crevice for receiving the fastener. In some embodiments, the actuator includes a button protruding from a button aperture in an upper surface of the housing and a button shaft extending from the button into an interior of the housing. A hook mechanically communicates with the button shaft such that the hook rotates as an actuating force is applied to the button.

The spool includes a spool body and a first spool rim disposed on a distal end of the spool body. The first spool rim has a plurality of teeth for engaging the hook. The spool also has a second spool rim disposed opposite the first spool rim. The actuator includes a second hook mechanically communicating with the button shaft such that the second hook rotates as an actuating force is applied to the button, and the second spool rim has a plurality of teeth for engaging the second hook. In some embodiments, an elastic band is connected to and applies a force on the hook such that the hook maintains substantial engagement with at least one of the plurality of teeth at least until the actuating force is applied to the button.

In various embodiments, at least one of the leash, fastener, and the housing is camouflage colored for minimizing its visibility in wooded environments and in various other embodiments, at least one of the leash, fastener, and housing emits illumination for maximizing its visibility in dark environments.

In accordance with another embodiment of the invention, a pet collar assembly removably attached to a pet collar carries a leash and allows for extending and retracting the leash as necessary. The pet collar assembly includes a housing and an actuator assembly disposed adjacent the housing for actuating retraction of the leash upon receiving outside force higher than a threshold retraction force. The actuator assembly includes a button protruding from a button aperture in an upper surface of the housing for receiving the outside force and a button shaft attached to the button, extending into the housing and having a plurality of actuator notched threads. A hook shaft is disposed substantially perpendicular to the button shaft and has a plurality of hook notched threads corresponding to and engaging the plurality of actuator notched threads such that as the button shaft moves in a longitudinal direction, the hook shaft rotates about its longitudinal axis. A hook is attached to the hook shaft for rotating with the hook shaft; and an elastic band attached to the hook and an interior of the housing for biasing the actuator assembly in a locked configuration. When the button receives an outside force greater than the threshold retraction force, the button and the button shaft extend further into the housing causing the hook shaft and the hook to rotate. Finally, the pet collar assembly has a spool that communicates with the actuator assembly and is biased for coiling the leash when the actuator assembly receives outside force higher than the threshold retraction force.

In some embodiments, the pet collar assembly also includes a fastener receiver disposed proximate to an upper surface of the housing and wherein the leash has a distal end and comprises a fastener disposed at its distal end, the fastener for detachably mating with the fastener receiver. The fastener receiver comprises a first piece and a second piece disposed proximate to one another and providing a crevice for receiving the fastener.

In various embodiments, the spool includes a spool body and a first spool rim disposed on a distal end of the spool body, the first spool rim having a plurality of teeth for engaging the hook. The spool also includes a second spool rim disposed opposite the first spool rim, and the actuator assembly also includes a second hook attached to the hook shaft opposite the first hook and for rotating with the hook shaft. In such embodiments, the second spool rim has a plurality of teeth for engaging the second hook.

In other embodiments, the elastic band biases the actuator assembly in the locked configuration by applying a force on the hook such that the hook maintains substantial engagement with at least one of the plurality of teeth at least until the threshold retracting force is applied to the button. Such a configuration, where the threshold retracting force is applied to the button is referred to as the retracting configuration.

In various embodiments, at least one of the leash, fastener, and the housing is camouflage colored for minimizing its visibility in wooded environments, and in other embodiments, at least one of the leash, fastener, and housing emits illumination for maximizing its visibility in dark environments.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

The present disclosure provides a pet collar having a leash retractable into a housing removably attached to the collar. In one embodiment, the leash is retracted onto a spool disposed within the housing when a retraction button is depressed.

Figure 1:
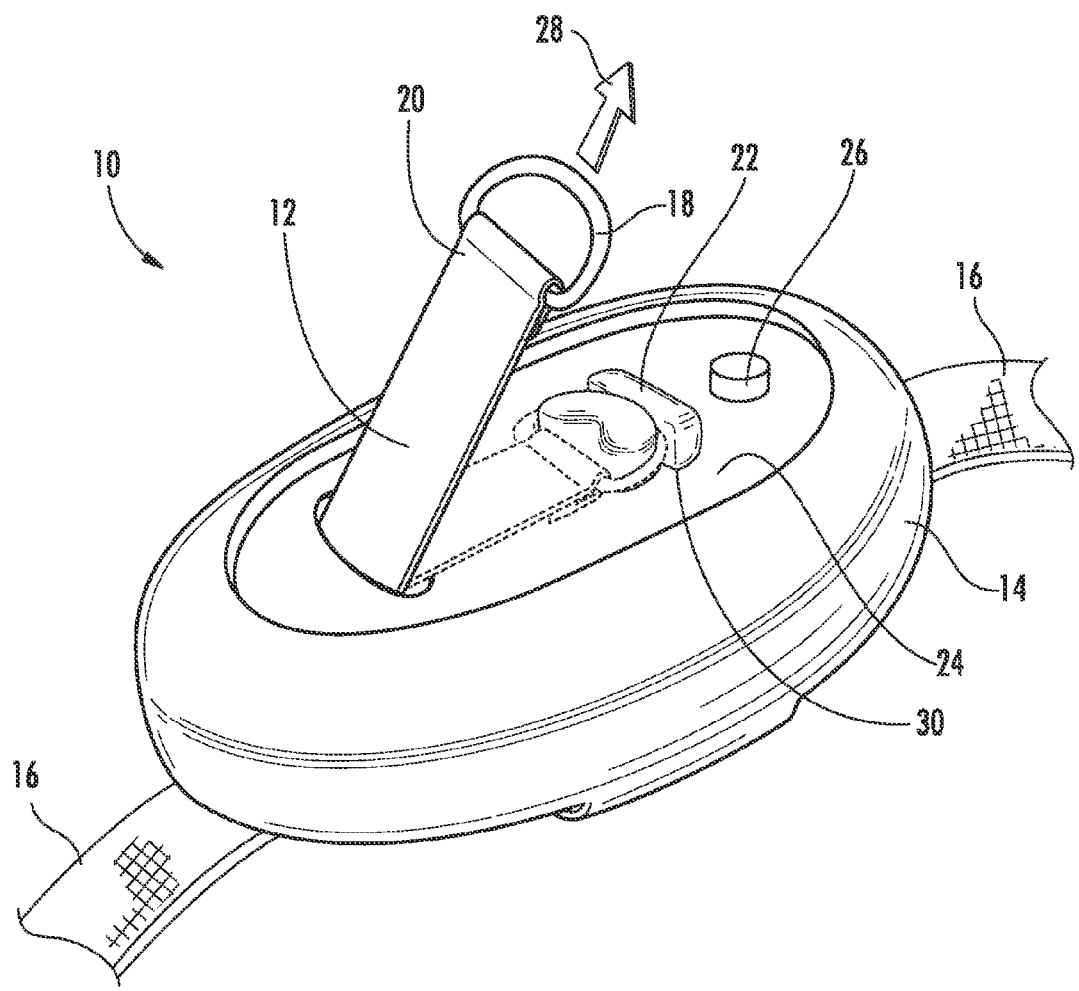
FIG. 1 is a perspective view of a pet collar assembly.
Figure 2:
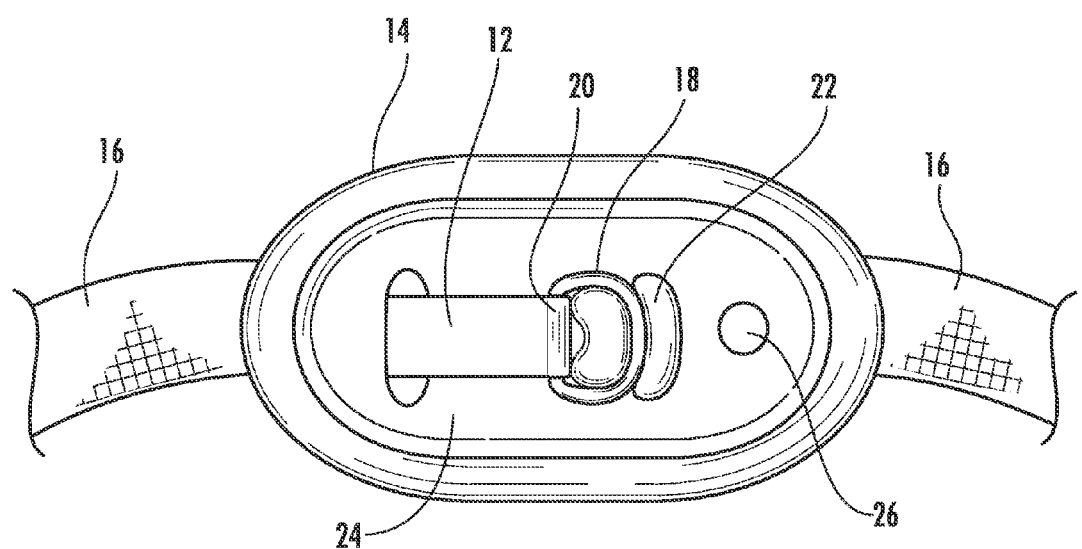
FIG. 2 is an overhead view of the pet collar assembly.
Figure 3:
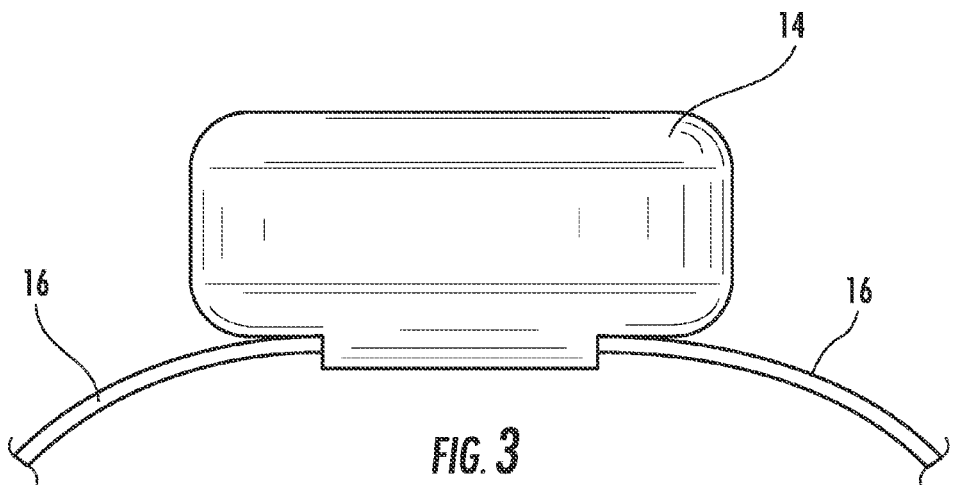
FIG. 3 is a side view of the pet collar assembly.
Figure 4:
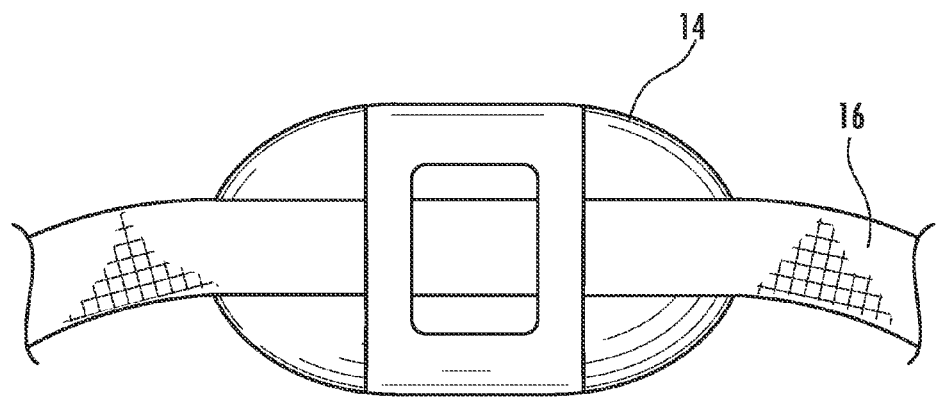
FIG. 4 is an underneath view of the pet collar assembly.

Referring now to FIG. 1, a pet collar assembly 10 has a leash 12 retractable into a housing 14. The housing 14 is removably attached to a collar 16. The collar 16 can be various sizes in order to fit various size pets or may be adjustable so that one collar 16 fits various sizes of pets. A fastener 18 is disposed at a distal end 20 of the leash 12. A fastener receiver 22 is disposed on an upper surface 24 of the housing 14 and is configured for receiving and detachably securing the fastener 18 of the leash 12. A button 26 is also disposed on the upper surface 24 of the housing 14 and, when the button is depressed, the leash 12 retracts into the housing 14. Tension remains on the leash 12 such that the leash must be pulled out from the housing 14 in the direction of arrow 28. Typically, the leash 12 does not extend without such applied force.

The fastener 18 serves multiple functions including providing a handle for the pet owner and coupling with the fastener receiver 22 when the leash 12 is retracted. The fastener 18 can be made from many different types of materials including but not limited to metals, metal alloys, composites, ceramics, plastics, combinations thereof and the like. The fastener receiver 22 as shown in FIG. 1 has two pieces disposed proximate to one another such that they provide a crevice 30 for receiving the fastener 18. In the embodiment shown, the fastener 18 couples with the fastener receiver 22 by fitting in between the two pieces of the fastener receiver 22. In some embodiments, the fastener receiver 22 is made of rubber or a material with similar characteristics including the elastic and frictional properties of rubber or synthetic rubber materials.

Figure 5:
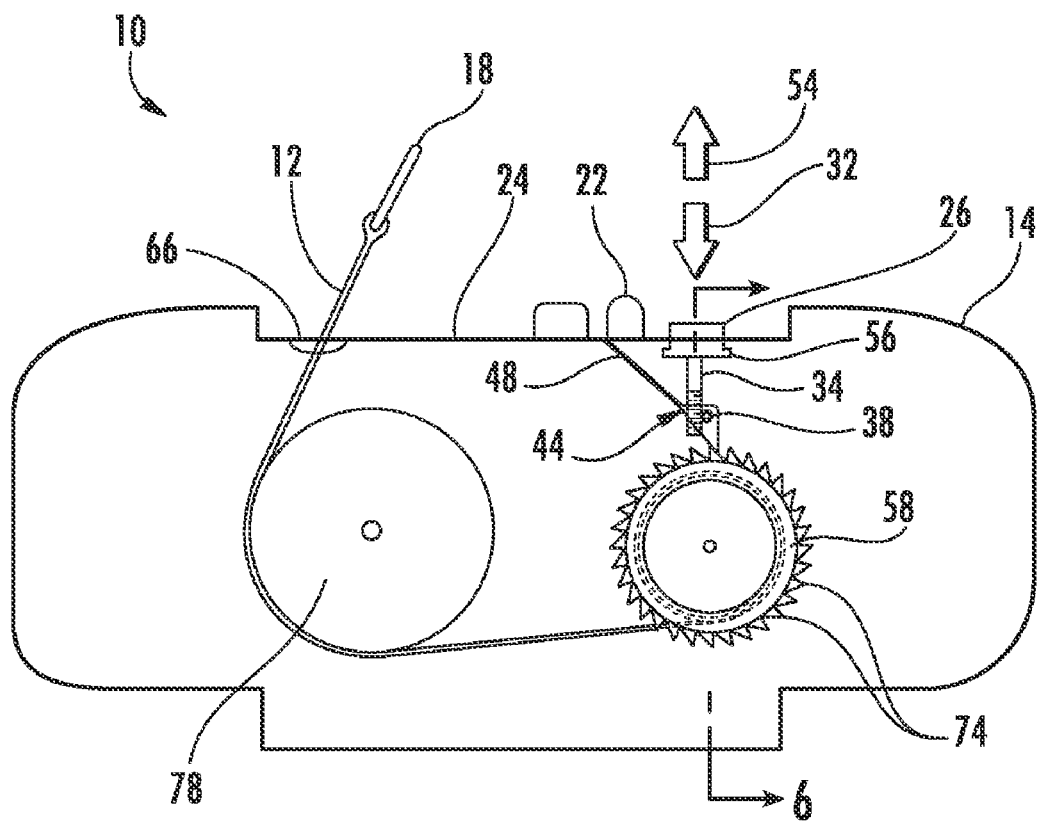
FIG. 5 is a longitudinal cross-sectional view of the pet collar assembly.
Figure 6:
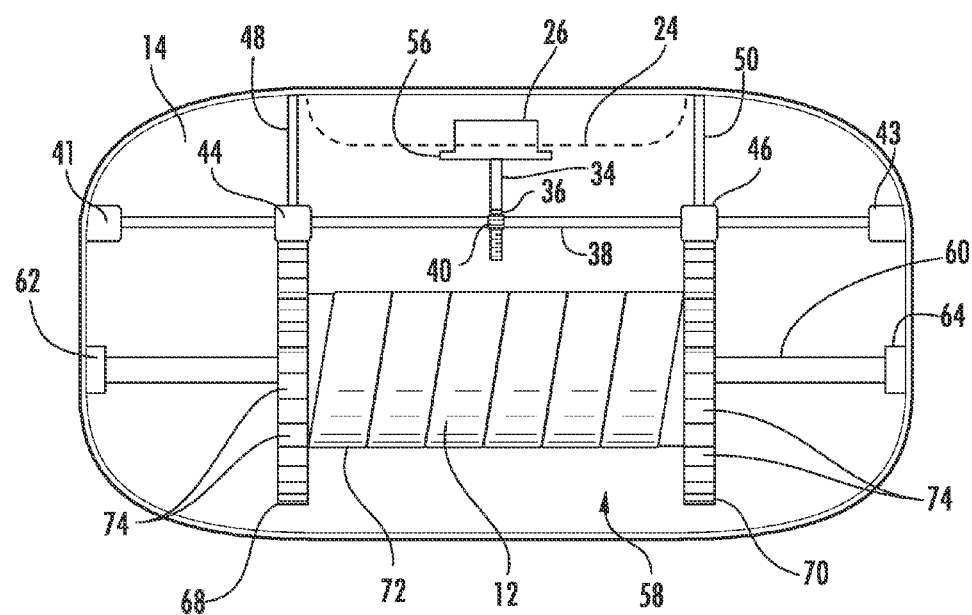
FIG. 6 is a latitudinal cross-sectional view of the pet collar assembly.
Figure 7:
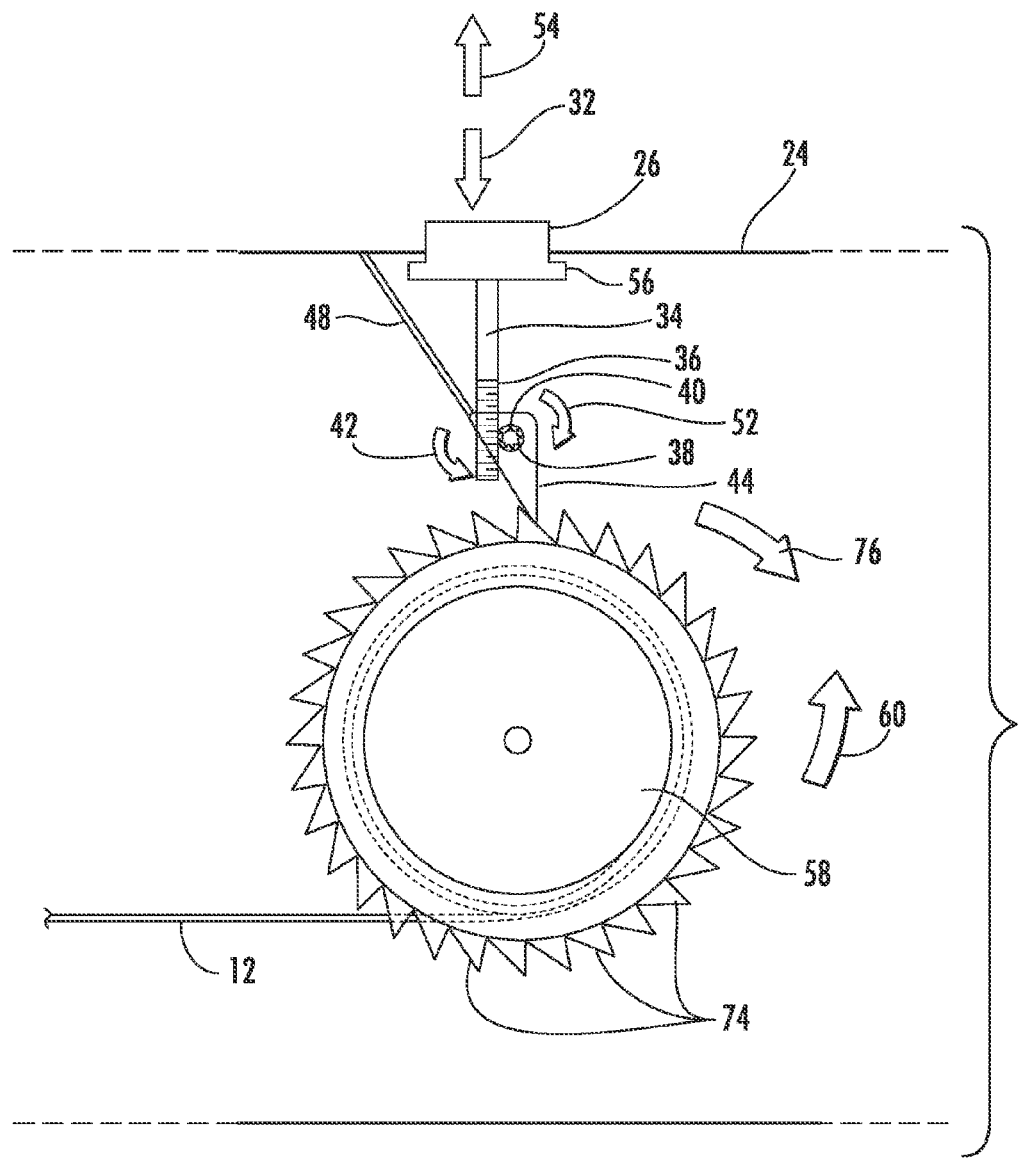
FIG. 7 is a close-up view of the retraction mechanism of the pet collar assembly.

Referring now to FIGS. 5-7, various views of the interior of the pet collar assembly 10 are shown. In the embodiment shown, the leash 12 is biased to retract upon depression of the button 26 in the direction of arrow 32. The button is connected to button shaft 34, which has many notched threads 36. The notched threads 36 mate with hook shaft 38 at corresponding notched threads 40. As the button is depressed, the button shaft moves in the direction of arrow 32 and notched threads 36 transfer the movement to notched threads 40 of hook shaft 38 causing hook shaft 38 to rotate in the direction of arrow 42. Hook shaft 38 rotates in hook shaft sleeves 41 and 43, which are disposed on the interior of the housing 14. Hooks 44 and 46 are connected to and rotate with and about hook shaft 38. Such rotation of hooks 44 and 46 as well as hook shaft 38 is opposed by a force imposed by elastic bands 48 and 50, which are connected to hooks 44 and 46 respectively and the underside of the housing 24.

This configuration creates a torque in the direction of arrow 52. When button 26 is not depressed, the force imposed by elastic bands 48 and 50 pull hooks 44 and 46 in the direction of arrow 52. The hook shaft 38 rotates and transfers the motion to button shaft 34, resulting in the button moving in the direction of arrow 54. The button 26 has a button rim 56 around its lower circumference that is wider than the button aperture in the housing. Therefore, as the button is pushed in the direction of arrow 54, its rim 56 comes to rest against the underside of the housing 24, thereby preventing further movement in the direction of arrow 54.

Leash spool 58 receives and coils the leash 12 as it is retracted. The spool 58 is internally biased to rotate in the direction of arrow 60 and thereby retract and coil the leash 12. Spool 58 rotates about spool shaft 60, which is disposed in mountings 62 and 64. In one embodiment, the biasing mechanism includes a spring connected to both the spool shaft 60 and the spool 58. In such a configuration, when the leash 12 is in a fully retracted position, that is, when the fastener 18 is retracted such that it rests against the leash aperture 66 (FIG. 5), the internal biasing of the spool 58 continues to provide retraction force. In other words, the spring or other biasing mechanism within the spool is configured such that it retracts the leash into the fully retracted position.

On both longitudinal ends of the spool 58, spool rims 68 and 70 have a greater circumference than the body 72 of the spool 58. Each of the spool rims 68 and 70 have a plurality of teeth 74 disposed along their circumferences. The teeth 74 interact with hooks 44 and 46. As the leash 12 is pulled out from the pet collar assembly 10, spool 58 rotates in the direction of arrow 76 and the leash 12 uncoils from its coil on the body 72 of the spool 58. The teeth 74 slide against hooks 44 and 46 and cause the hooks to rotate a small amount in the direction of arrow 42. This pulls the button in the direction of arrow 32 as the leash is extended. When a user desires to retract the leash and button 26 is depressed in the direction of arrow 32 with sufficient force, hooks 44 and 46 rotate in the direction of arrow 42 as discussed above, and the hooks 44 and 46 disengage the teeth 74, thereby allowing the spool to rotate in the direction of arrow 60 and retract the leash 12. In other embodiments of the invention, various other retraction mechanisms are used and various other retraction prevention configurations are contemplated.

The configuration where the leash is not retracting is called the "locked configuration," and the configuration where the leash is allowed to retract is referred to as the "retracting configuration" Generally, force applied to the button is referred to as "outside force," and such outside force must exceed a "threshold retraction force" for the actuator assembly to change from a locked configuration to a retracting configuration.

As shown in FIG. 5, a directional spool 78 is used in some embodiments to redirect the leash 12 to spool 58 for retraction and coiling. Such a configuration is used in order to coil the leash proximate to the actuating mechanism, which in this embodiment includes the button and its function as discussed above.

In various embodiments, at least one of the leash, fastener, and the housing is camouflage colored for minimizing its visibility in wooded environments, and in other embodiments, at least one of the leash, fastener, and housing emits illumination for maximizing its visibility in dark environments. In various other applications, any color and/or design can be used for the leash, fastener, and/or housing as appropriate for the needs of the application or based on aesthetic considerations.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A pet collar assembly removably attached to a pet collar for carrying a leash and extending and retracting the leash as necessary, the pet collar assembly comprising:
   a. a housing;
   b. an actuator disposed adjacent the housing for actuating retraction of the leash upon receiving outside force higher than a threshold retraction force, the actuator including a button protruding from a button aperture in an upper surface of the housing, a threaded button shaft extending from the button into an interior of the housing, and a hook mechanically engaging with the button shaft threads such that the hook rotates when a linear actuating force is applied to the button; and
   c. a spool communicating with the actuator and for coiling the leash when the actuator receives outside force higher than the threshold retraction force.

2. The pet collar assembly of claim 1 further comprising a fastener receiver disposed proximate to an upper surface of the housing and wherein the leash has a distal end and comprises a fastener disposed at its distal end, the fastener for detachably mating with the fastener receiver.

3. The pet collar assembly of claim 2 wherein the fastener receiver comprises a first piece and a second piece disposed proximate to one another and providing a crevice for receiving the fastener.

4. The pet collar assembly of claim 1 wherein the spool comprises a spool body and a first spool rim disposed on a distal end of the spool body, the first spool rim having a plurality of teeth for engaging the hook.

5. The pet collar assembly of claim 4 wherein the spool further comprises a second spool rim disposed opposite the first spool rim, and wherein the actuator further comprises a second hook mechanically communicating with the button shaft such that the second hook rotates as an actuating force is applied to the button, and wherein the second spool rim has a plurality of teeth for engaging the second hook.

6. The pet collar assembly of claim 1 wherein the actuator further comprises an elastic band connected to and applying a force on the hook such that the hook maintains substantial engagement with at least one of the plurality of teeth at least until the actuating force is applied to the button.

7. The pet collar assembly of claim 1 wherein at least one of the leash, fastener, and the housing is camouflage colored for minimizing its visibility in wooded environments.

8. The pet collar assembly of claim 1 wherein at least one of the leash, fastener, and housing emits illumination for maximizing its visibility in dark environments.

9. A pet collar assembly removably attached to a pet collar for carrying a leash and extending and retracting the leash as necessary, the pet collar assembly comprising:
   a. a housing;
   b. an actuator assembly disposed adjacent the housing for actuating refraction of the leash upon receiving outside force higher than a threshold retraction force comprising:
      a button protruding from a button aperture in an upper surface of the housing for receiving the outside force;
      a button shaft attached to the button, extending into the housing and having a plurality of actuator notched threads;
      a hook shaft disposed substantially perpendicular to the button shaft and having a plurality of hook notched threads corresponding to and engaging the plurality of actuator notched threads such that as the button shaft moves in a longitudinal direction, the hook shaft rotates about its longitudinal axis;
      a hook attached to the hook shaft for rotating with the hook shaft; and
      an elastic band attached to the hook and an interior of the housing for biasing the actuator assembly in a locked configuration;
      and wherein when the button receives an outside force greater than the threshold retraction force, the button and the button shaft extend further into the housing causing the hook shaft and the hook to rotate; and
   c. a spool communicating with the actuator assembly and biased for coiling the leash when the actuator assembly receives outside force higher than the threshold retraction force.

10. The pet collar assembly of claim 9 further comprising a fastener receiver disposed proximate to an upper surface of the housing and wherein the leash has a distal end and comprises a fastener disposed at its distal end, the fastener for detachably mating with the fastener receiver.

11. The pet collar assembly of claim 10 wherein the fastener receiver comprises a first piece and a second piece disposed proximate to one another and providing a crevice for receiving the fastener.

12. The pet collar assembly of claim 9 wherein the spool comprises a spool body and a first spool rim disposed on a distal end of the spool body, the first spool rim having a plurality of teeth for engaging the hook.

13. The pet collar assembly of claim 12 wherein the spool further comprises a second spool rim disposed opposite the first spool rim, and wherein the actuator assembly further comprises a second hook attached to the hook shaft opposite the first hook and for rotating with the hook shaft, and wherein the second spool rim has a plurality of teeth for engaging the second hook.

14. The pet collar assembly of claim 12 wherein the elastic band biases the actuator assembly in the locked configuration by applying a force on the hook such that the hook maintains substantial engagement with at least one of the plurality of teeth at least until the threshold retracting force is applied to the button during which the actuator assembly is in a retracting configuration.

15. The pet collar assembly of claim 9 wherein at least one of the leash, fastener, and the housing is camouflage colored for minimizing its visibility in wooded environments.

16. The pet collar assembly of claim 9 wherein at least one of the leash, fastener, and housing emits illumination for maximizing its visibility in dark environments.

* * * * *